United States Patent Office 2,915,477
Patented Dec. 1, 1959

2,915,477

METHOD FOR PRODUCING MICA PULP

Hans-Werner Rotter, Nurnberg, Germany, assignor to Siemens - Schuckertwerke Aktiengesellschaft, Berlin-Siemensstadt and Erlangen, Germany, a German corporation No Drawing. Application July 12, 1957
Serial No. 671,379

7 Claims. (Cl. 252—378)

My invention relates to a method for producing an inorganic pulp, particularly a pulp of mica.

It is known to convert calcined mica into a mica pulp by introducing the mica into sulphuric acid, for example in 10% concentration. The acid penetrates into the layers loosened by calcination and then drives the layers further apart. Complete conversion into a pulp, however, is attained only by additional vigorous stirring and rubbing of the mica particles. When water is used the swelling action is of even less extent, so that a still more vigorous agitation is required. This, however, has a detrimental effect upon the mutual adhesion ability of the particles, required for the manufacture of paper-like foils.

Prior methods have various disadvantages. Thus, the use of vacuum or of an autoclave to produce pressure between the laminations is uneconomical for continuous production. The application of chemical reagents involves various requirements or inconveniences. For example, when applying the customarily used sulphuric acid followed, as the case may be, by a subsequent treatment by lye, the acid must again be tediously washed out of the product. If complete neutralization is produced by the lye, the mutual adhesion ability of the particles is impaired. Furthermore, such pulps, treated with chemical reagents, are suitable only for further fabrication into foils, whereas the resulting increased electrolytic conductance and the precipitation of the unstable suspension, makes this suspension no longer suitable for electrophoretic precipitation of the mica particles.

It is an object of my invention to obviate all these disadvantages.

To this end, and in accordance with my invention, the material, particularly calcined or partially weathered mica, is introduced into an aqueous solution of a substance comprising a compound which, after penetrating into the inorganic substance, liberates gas without leaving a residue affecting the adhesion ability of the particles. Particularly suitable are the well known per-compounds which liberate gas by decomposition upon dissolution in water. For example, the mica is introduced into a 5 to 30% solution of hydrogen peroxide in water. Perhydrol, comprising 30% hydrogen peroxide, can be used.

The mica rapidly saturates itself with the hydrogen peroxide solution. The hydrogen peroxide has the desirable property of disassociating into oxygen and water, without employing a second reagent. This produces an extremely vigorous development of gas which swells the mica pieces, already widened by calcination, to 5 to 10 times the previous volume.

The advantages of the preferred method, therefore, reside in the fact that only one solution is employed, and that this solution has only water as residue or non-gaseous product, so that no washing of the pulp and no disturbing after-effects occur. The splitting of the mica is satisfactory to an extent such that only a slight mechanical after-treatment is sufficient for reduction of the mica pieces to a mica pulp. This further contributes toward preserving the desired high adhesion ability of the particles, relative to each other. The effect of the perhydrol can be accelerated and amplified by heating the solution to a temperature up to about 100° C.

In the following examples, instead of calcined mica one may also use mica which, due to weathering, is delaminated at least at the edges so that the perhydrol solution can penetrate into the hollow spaces with the result that the mica is split due to the blasting action of the gases evolving from the breakdown of the perhydrol in water and oxygen. Among these already weathered types of mica are, for example, batavite, serizite, and vermiculite.

*Example 1*

50 grams of calcined Muskovite were introduced into ½ a liter of 20% aqueous hydrogen peroxide solution and were kept in the solution for twenty-four hours. Thereafter the mica was further reduced by placing it in a stirring vessel and subjecting it for seven seconds to stirring at 12,000 rotations per minute. The resulting pulp was fabricated into foils which exhibited a tear strength of 4 kg./mm.$^2$.

*Example 2*

50 grams of calcined Muskovite were placed in ½ a liter of 10% aqueous hydrogen peroxide solution and were kept therein for twenty-four hours. Thereafter the suspension was introduced into a swing mill, and reduced for an additional period of twenty-four hours, to provide a mica suspension with a median particle size of 1 $\mu$. A stable suspension was thus produced. This suspension was degassed by vacuum, and was employed to make good electrophoretic coatings of varnish-like character.

The process is applicable for the production of scale-shaped mica splittings of fine size. The preliminary calcining is generally carried out at a temperature of 780° to 850° C.

The process is also applicable to other known types of mica-like laminated siliceous materials which can be split into thin sheets.

The perhydrol solution may be replaced by other peroxidic compounds which decompose into oxygen without formation of a residue detrimental to the ability of the particles to adhere together. Organic and inorganic peroxides may be used for this purpose.

Also applicable are other per compounds, such as per acids. They function in the same way, in that the splitting off of oxygen causes increased swelling of the mica without the aid of mechanical auxiliaries. However, it is then necessary to wash out the residual acid with water or dilute alkali. When using an aqueous solution of hydrogen peroxide, such washing out is avoided because the hydrogen peroxide becomes disassociated into oxygen and water, and these disassociation products do not in any way impair the bonding ability of the mica particles. Examples of suitable per-acids are perchloric acid and persulphuric acid.

I claim:

1. The method of making a mica pulp comprising immersing mica particles in aqueous hydrogen peroxide of about 3 to 30% concentration, the mica particles having delaminated edges and subjecting said particles to mechanical attrition while in contact with the aqueous hydrogen peroxide.

2. The method of disintegrating mica comprising contacting mica particles for at least several hours with an aqueous hydrogen peroxide solution of about 3 to 30% concentration, by soaking it therein and thereafter subjecting said particles to mechanical attrition while in liquid suspension.

3. The method of disintegrating mica comprising contacting mica particles for at least several hours with an aqueous hydrogen peroxide solution of about 3 to 30% concentration, the particles being immersed in the solution, the solution being heated above room temperature to accelerate the effect of the peroxide, the mica particles employed having delaminated edges, the particles being subjected to mechanical attrition while in contact with the aqueous hydrogen peroxide.

4. A method for making a mica pulp comprising impregnating a weathered form of mica with aqueous hydrogen peroxide, the oxygen gas generated thereby in situ between laminations of the mica causing swelling of the volume of the mica, and mechanically reducing the resulting pieces of material in liquid suspension.

5. The method of making a mica pulp comprising immersing a mica material taken from the group consisting of calcined and weathered mica, in water containing hydrogen peroxide in sufficient concentration to cause vigorous liberation of oxygen, the oxygen gas generated thereby in situ between laminations of the mica causing swelling of the volume of the material, the mica material being one which is delaminated at least at the edges, the particles being subjected to mechanical attrition while in contact with the aqueous hydrogen peroxide.

6. A method for making a mica pulp suitable for making suspensions utilizable for electrophoretic precipitation of the mica particles to form coatings, comprising immersing calcined mica in aqueous hydrogen peroxide to cause swelling and splitting thereof, and mechanically reducing the resulting mica pieces in suspension.

7. The method of making a mica pulp comprising immersing mica particles in aqueous hydrogen peroxide of about 3 to 30% concentration, the mica particles being taken from the group consisting of calcined and weathered micas, the immersion being in substantially neutral medium and continuing for at least an hour, the the mica particles being subjected to mechanical attrition while in contact with the aqueous hydrogen peroxide.

References Cited in the file of this patent

UNITED STATES PATENTS

| | | |
|---|---|---|
| 2,659,412 | Heyman | Nov. 17, 1953 |
| 2,709,158 | Bouchet | May 24, 1955 |

UNITED STATES PATENT OFFICE

CERTIFICATE OF CORRECTION

Patent No. 2,915,477   December 1, 1959

Hans-Werner Rotter

It is hereby certified that error appears in the above numbered patent requiring correction and that the said Letters Patent should read as corrected below.

In the heading to the printed specification, between lines 8 and 9, insert the following:

Claims priority, application Germany July 14, 1956

Signed and sealed this 21st day of June 1960.

(SEAL)
Attest:

KARL H. AXLINE
Attesting Officer

ROBERT C. WATSON
Commissioner of Patents